United States Patent [19]

Dyer et al.

[11] Patent Number: 4,789,385
[45] Date of Patent: Dec. 6, 1988

[54] THERMALLY STABLE DIAMOND ABRASIVE COMPACT BODY

[76] Inventors: Henry B. Dyer, 28 George Street, Bryanston; Cornelius Phaal, 34 Rutland Avenue, Craighall Park; Richard P. Brunand, 39 Constantia Avenue, Alan Manor, all of Transvaal, South Africa

[21] Appl. No.: 47,531

[22] Filed: May 4, 1987

Related U.S. Application Data

[63] Continuation of Ser. No. 871,103, Jun. 5, 1986, abandoned.

[30] Foreign Application Priority Data

Jun. 7, 1985 [ZA] South Africa .................. 85/4339
May 1, 1986 [ZA] South Africa .................. 86/3275

[51] Int. Cl.$^4$ .................................. B24D 3/00
[52] U.S. Cl. .......................... 51/293; 51/295; 51/308; 51/309
[58] Field of Search ............... 51/293, 295, 308, 309

[56] References Cited

U.S. PATENT DOCUMENTS

| | | | |
|---|---|---|---|
| 3,239,321 | 3/1966 | Blainey et al. | 51/309 |
| 3,306,720 | 2/1967 | Darrow | 51/293 |
| 3,574,580 | 4/1971 | Stromberg et al. | 51/307 |
| 3,912,500 | 10/1975 | Vereschagin et al. | 51/309 |
| 3,944,398 | 3/1976 | Bell | 51/307 |
| 3,982,911 | 9/1976 | Lee | 51/307 |
| 3,999,962 | 12/1976 | Drui et al. | 51/309 |
| 4,124,401 | 11/1978 | Lee et al. | 51/307 |
| 4,151,686 | 5/1979 | Lee et al. | 51/307 |
| 4,171,339 | 10/1979 | Lee et al. | 51/309 |
| 4,231,195 | 11/1980 | DeVries et al. | 51/307 |
| 4,241,135 | 12/1980 | Lee et al. | 51/308 |
| 4,311,490 | 1/1982 | Bovenkerk et al. | 51/293 |
| 4,457,765 | 7/1984 | Wilson | 51/293 |
| 4,496,372 | 1/1985 | Almond et al. | 51/293 |
| 4,505,721 | 3/1985 | Almond et al. | 51/309 |
| 4,534,773 | 8/1985 | Phaal et al. | 51/308 |
| 4,556,403 | 12/1985 | Almond et al. | 51/308 |

FOREIGN PATENT DOCUMENTS 997352 7/1965 United Kingdom .
2158086 11/1986 United Kingdom .

OTHER PUBLICATIONS

Bullen, G. J., "The Effect of Temperature and Matrix on the Strength of Synthetic Diamond", Industrial Diamond Review, Oct. 1975, pp. 363–365.

Primary Examiner—Paul Lieberman
Assistant Examiner—Willie J. Thompson
Attorney, Agent, or Firm—Curtis, Morris & Safford

[57] ABSTRACT

The invention provides a composite diamond abrasive compact comprising a thermally stable diamond compact directly bonded to a cemented carbide substrate. The thermally stable diamond compact comprises bonded diamond forming a coherent, skeletal mass and a second phase which preferably consists of silicon and/or silicon carbide. A method of producing the composite diamond abrasive compact under controlled elevated temperature and pressure conditions is also provided.

13 Claims, 1 Drawing Sheet

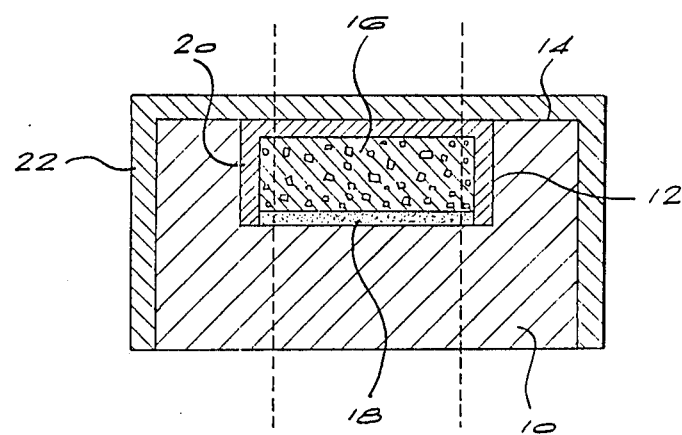

THERMALLY STABLE DIAMOND ABRASIVE COMPACT BODY

This application is a continuation of application Ser. No. 871,103, filed June 5, 1986, now abandoned.

BACKGROUND OF THE INVENTION

This invention relates to a thermally stable diamond abrasive body.

Diamond abrasive compacts are well known in the art and consist essentially of a mass of diamond abrasive particles present in an amount of at least 70 percent, preferably 80 to 90 percent, by volume of the compact bonded into a hard conglomerate. Compacts are polycrystalline masses and can replace single large crystals in many applications.

Diamond compacts will typically contain a second phase evenly distributed through the diamond mass. The second phase may contain a dominant amount of a catalyst/solvent for diamond synthesis such as cobalt, nickel or iron. Diamond compacts having second phases of this nature will generally not have thermal stability above 700° C. Other second phases, particularly those which contain little or no diamond catalyst/solvent, produce diamond compacts which have thermal stability above 700° C.

Diamond abrasive compacts may be used alone or as composite compacts in which event they are backed with a cemented carbide substrate. Composite diamond abrasive compacts wherein the second phase contains a diamond catalyst/solvent are widely used in industry. However, difficulty has been experienced in producing a composite diamond abrasive compact or carbide supported wiredrawing dies wherein the diamond compact is thermally stable above 700° C. To the best of the Applicant's knowledge, no such products are commercially available.

SUMMARY OF THE INVENTION

According to the invention, there is provided a composite diamond abrasive compact comprising a thermally table diamond compact comprising bonded diamond forming a coherent, skeletal mass and a second phase, which compact is bonded directly to a cemented carbide substrate.

The invention provides according to another aspect a method of producing a composite diamond abrasive compact as described above including the steps of placing the components necessary to produce the second phase on a surface of a cemented carbide substrate, placing a mass of diamond particles on the component mass and subjecting the whole to controlled elevated temperature and pressure conditions to produce the diamond compact which is bonded to the substrate.

DESCRIPTION OF THE DRAWING

The drawing illustrates a sectional side view of an assembly for use in producing a composite diamond abrasive compact of the invention.

DETAILED DESCRIPTION OF THE INVENTION

The diamond compact is thermally stable in the sense that it will withstand a temperature of 1200° C. under a vacuum of 10 Torr or better, or in an inert or reducing atmosphere without significant graphitisation of the diamond occurring. The second phase for the diamond compact may, for example, be silicon, or other suitable refractory carbide former, alone or in combination with another metal. Examples of suitable second phases are:

Silicon
Silicon/nickel
Silicon/cobalt.

In each of the above, small quantities of boron may be included. The ratio of silicon to other metal may be in the range 50:50 to 90:10 by volume.

In all the above examples, the metals in the second phase will be in the form of the metal, a carbide and/or an inter-metallic compound.

The diamonds may be natural or synthetic.

The preferred thermally stable diamond abrasive compact is that described in British Patent Publication No. 2158086. This thermally stable diamond abrasive compact comprises a mass of diamond particles present in an amount of 80 to 90 percent by volume by the body and a second phase present in an amount of 10 to 20 percent by volume of the body, the mass of diamond particles containing substantial diamond-to-diamond bonding to form a coherent skeletal mass and a second phase containing silicon in the form of silicon and/or silicon carbide.

The thermally stable diamond abrasive compact is directly bonded to the cemented carbide substrate. This means that there is no interposing metal or like bonding layer. There will, of course, be a thin bonding interfacial zone between the cemented carbide and the diamond compact. This zone will contain some diamond, some second phase for the thermally stable diamond compact and some carbide components.

The composite diamond abrasive compact of the invention has a wide variety of uses. it has been found particularly useful in the drilling of hard and abrasive rocks. For this purpose a plurality of composite diamond abrasive compacts may be mounted in a conventional drill bit. In so doing, high temperature brazes may be used because of the thermal stability of the diamond compact which forms part of the composite compact. The composite diamond abrasive compact may also be a carbide supported wire-drawing die.

In producing the composite diamond abrasive compact it is essential that the components for the second phase be placed on a surface of the cemented carbide substrate and infiltrate from there into the diamond mass during compact manufacture. This, it has been found, enables the compact to be produced without any significant infiltration of the carbide binder phase into the diamond mass.

The second phase components may be placed directly on and in contact with the carbide surface. Alternatively a thin layer of no more than a few microns of various compatible, particulate masses may be placed between the second phase components and the carbide surface. These layers may consist of:

(a) Fine diamond particles of less than 1 micron particle size: or (b) Fine powdered carbide of particle size less than 1 micron having no binder phase.

(c) Powdered carbide, preferably less than 1 micron particles, containing a lower binder content than the carbide substrate. For example, if the binder content of the substrate is 11 to 13 percent by weight then the binder content of the powdered layer may be 6 to 7 percent by weight; or (d) Powdered carbide of a second phase metal, for example silicon carbide (SiC).

A recess may be formed in a cemented carbide body and the diamond and second phase components loaded therein such that the second phase components lie on the base of the recess and the diamond particles on top of the second phase components. Means, such as a layer of a high melting metal, e.g. tantalum, are provided between the diamond and the side walls of the recess to prevent sideways infiltration of the binder phase from the carbide into the diamond mass.

The elevated conditions of temperature are preferably in the range 1400° to 1550° C. The elevated conditions of pressure are preferably in the range 50 to 60 kilobars. These elevated conditions are preferably maintained for a period of 10 to 20 minutes.

The cemented carbide substrate may be any known in the art such as cemented titanium carbide, cemented tungsten carbide, or cemented tantalum carbide. The binder phase for the cemented carbide may also be any known in the art such as nickel, cobalt and iron. An embodiment of the invention will now be described with reference to the accompanying drawing. Referring to this drawing, there is shown a cylindrical cemented tungsten carbide body 10 which has a recess 12 also of cylindrical shape formed in its top surface 14. Loaded into this recess is a mass of diamond particles 16 which are placed on top of a mass of silicon powder or silicon foil 18. A tantalum cup 20 encloses both the diamond mass and the silicon powder. A further tantalum cup 22 is provided over the loaded cemented carbide body, as illustrated.

The assembly as illustrated in the drawing is then placed in the reaction capsule of a conventional high temperature/high pressure apparatus. The assembly is subjected to controlled elevated temperature and pressure conditions suitable to produce a diamond compact, i.e., a temperature of about 1500° C. and pressure of about 55 kilobars, which condutions were maintained for a period of 15 minutes. Under these conditions, silicon from the layer 18 infiltrates into the diamond mass and forms a second phase consisting essentially of silicon carbide and/or silicon. Simultaneously, diamond bonding occurs to form a coherent, skeletal diamond mass. The silicon infiltrates substantially into the diamond mass. A controlled amount of cobalt binder from the cemented carbide infiltrates into the interface layer so that a direct bond is formed between the diamond compact and the cemented carbide substrate.

It has been found that the provision of the silicon between the carbide and diamond mass and the tantalum sides effectively limits binder phase from the cemented carbide infiltrating into the bulk of the diamond mass. This is important for the presence of such binder phase in the diamond mass reduces the thermal stability of the resulting compact.

After compact manufacture, the assmebly is recovered from the reaction capsule in conventional manner. To produce the composite diamond abrasive compact, the sides of the assembly are removed to the dotted lines indicated in the drawing and residual tantalum on the top surface of the compact is also removed. Removal may be achieved for example, by grinding.

We claim:

1. A method of producing a composite diamond abrasive compact which includes a diamond compact directly bonded to a cemented carbide substrate, said diamond compact containing bonded diamond forming a coherent skeletal mass and a second phase consisting essentially of a refractory carbide forming metal, alone or in combination with another metal, each such metal being in the form of the metal, a carbide, and intermetallic compound or a combination of two or more thereof, comprising the steps of loading diamond particles and components(s) utilized to produce the second phase in a recess formed in a cemented carbide body such that the second phase components(s) lie(s) on the base of the recess and the diamond particles on top of the said component(s), providing means between the diamond and the side walls of the recess to prevent sideways infiltration of binder phase from the cemented carbide into the diamond mass, and subjecting the whole to controlled elevated temperature and pressure conditions to produce the diamond compact which is directly bonded to the carbide body.

2. A method according to claim 1 which comprises placing the component(s) for the second phase directly on and in contact with the base of the recess formed in the carbide body.

3. A method according to claim 1 wherein a thin layer of no more than a few microns of a compatible particulate mass is placed between the second phase component(s) and the base of the recess formed in the carbide body.

4. A method according to claim 3 wherein the layer consists of powdered carbide containing a lower binder content than the carbide substrate.

5. A method according to claim 3 wherein the layer consists of powdered carbide containing a lower binder content than the carbide substrate and have a particle size of less than 1 micron.

6. A method to claim 4 wherein the layer consists of fine diamond particles of less than 1 micron particle size.

7. A method according to claim 3 wherein the layer consists of fine powdered carbide of particle size less than 1 micron having the same composition as that of the carbide substrate.

8. A method according to claim 3 wherein the layer consists of powdered carbide of a second phase metal.

9. A method according to claim 1 wherein the means is a layer of a high melting metal.

10. A method according to claim 1 wherein the means is a layer of tantalum.

11. A method according to claim 1 wherein the elevated conditions of temperature are in the range of 1400° to 1550° C., the elevated conditions of pressure are in the range 50 to 60 kilobars and these elevated conditions are maintained for a period of 10 to 20 minutes.

12. A method according to claim 1 wherein the cemented carbide is selected from the group consisting of cemented titanium carbide, cemented tungsten carbide and cemented tantalum carbide, each of which has a binder metal of nickel, iron, cobalt or a combination of two or more of said metals.

13. A method as defined in claim 1, wherein silicon is the component loaded into the recess so as to lie on the base of the recess.

* * * * *

UNITED STATES PATENT AND TRADEMARK OFFICE
CERTIFICATE OF CORRECTION

PATENT NO. : 4,789,385

DATED : Dec. 6, 1988

INVENTOR(S) : Henry B. Dyer, Cornelius Phaal, and Richard P. Burnand

It is certified that error appears in the above-identified patent and that said Letters Patent is hereby corrected as shown below:

Column 1, line 66 "vacuum of 10 Torr" should read --vacuum of $10^{-4}$ Torr--

Signed and Sealed this

Third Day of April, 1990

Attest:

HARRY F. MANBECK, JR.

Attesting Officer

Commissioner of Patents and Trademarks